No. 850,547. PATENTED APR. 16, 1907.
G. E. SMITH.
NAIL TONGS.
APPLICATION FILED MAY 21, 1906.
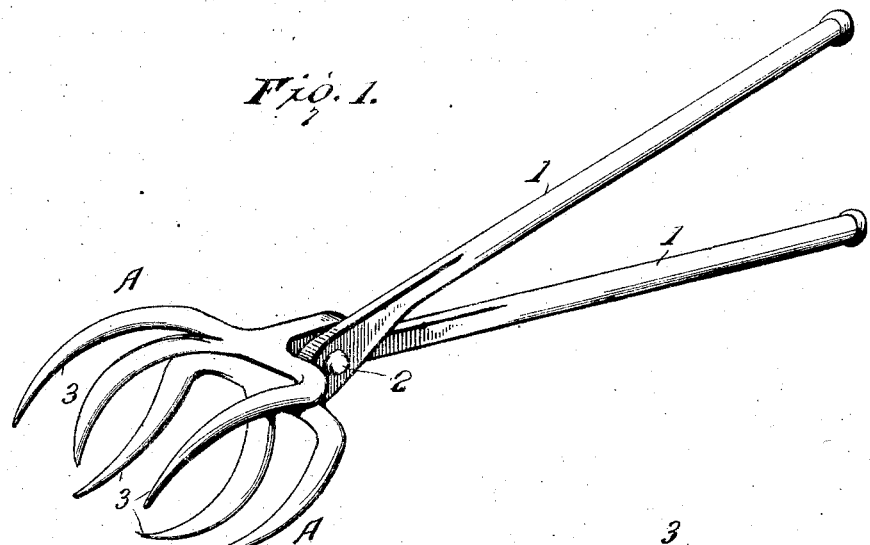
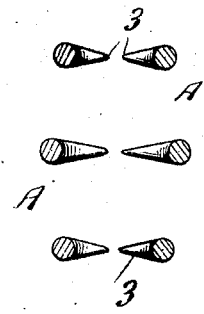
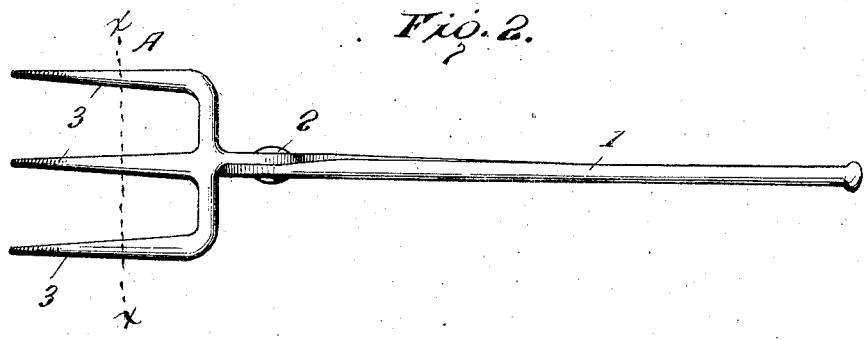
Witnesses
Inventor
G. E. Smith
By Attorneys

UNITED STATES PATENT OFFICE.

GEORGE E. SMITH, OF OYSTER BAY, NEW YORK.

NAIL-TONGS.

No. 850,547.     Specification of Letters Patent.     Patented April 16, 1907.

Application filed May 21, 1906. Serial No. 318,104.

*To all whom it may concern:*

Be it known that I, GEORGE E. SMITH, a citizen of the United States, residing at Oyster Bay, in the county of Nassau and State of New York, have invented certain new and useful Improvements in Nail-Tongs, of which the following is a specification.

This invention embodies a simple device particularly designed for removing nails from kegs or receptacles without necessitating the use of the hands for this purpose.

In carrying out the invention a peculiar form of tongs is utilized, said tongs comprising pivoted fork members arranged to readily engage a bunch of nails and accomplish the removal of the same in the manner above suggested.

For a full understanding of the invention and the merits thereof and also to acquire a knowledge of the details of construction of the means for effecting the result reference is to be had to the following description and accompanying drawings, in which—

Figure 1 is a perspective view of a device embodying the invention. Fig. 2 is a side elevation of the invention. Fig. 3 is a section taken on the line *x x* of Fig. 2.

Corresponding and like parts are referred to in the following description and indicated in all the views of the drawings by the same reference characters.

Referring to the drawings, the numeral 1 designates the handles of the tongs or device, said handles being pivotally connected at the point 2 by a suitable pivotal fastening. Each of the handles 1 is formed at one end with a fork A, which consists of a plurality of teeth 3, preferably of integral formation with each other and with the handle. The teeth 3 are curved in the length thereof, and same are adapted to readily engage nails in a receptacle or in any other place so as to grip said nails and firmly hold the same as they are transported short distances such as incident to the commerical handling of the commodity. The handles 1 are so manipulated as to open or spread the forks A in engaging the nails, after which the handles are forced together, so that the nails are firmly retained by the implement.

The invention is extremely simple in construction and is of obvious advantage from the standpoint of actual use.

It will be observed that the central tooth 3 of each fork A is made with a greater curvature than the outermost teeth of each fork, and this construction is advantageous for the reason that the outside teeth coöperate with the central tooth of each fork when the tongs are caused to engage therewith.

It will be observed that the central tooth 3 of each fork A has a greater curvature than the outermost teeth of each fork, while the central teeth at the same time are of such a length that their pointed ends are in transverse alinement with the ends of the outside teeth, as best seen in Fig. 2. This construction is advantageous, for the reason that in the practical use of the device the four outside prongs or teeth will press the nails to the center of the tongs and grip them tightly, while at the same time they will not allow the teeth to slip obliquely out of the tongs, as might be the case if the central teeth or prongs were longer than the outside teeth and out of alinement at their outer ends and with the outer ends of the outside teeth.

Having thus described the invention, what is claimed as new is—

A nail-handling device of the class described, comprising handles pivotally connected intermediate of their ends, one end portion of each handle being formed with a fork embodying outside teeth and intermediate teeth, all of which are curved lengthwise, the intermediate tooth of each fork being of greater curvature than the outer teeth of said fork, and the ends of all the teeth being in transverse alinement with each other.

In testimony whereof I affix my signature in presence of two witnesses.

GEORGE E. SMITH. [L. S.]

Witnesses:
 SIDNEY LEWIS,
 E. F. CHESHIRE.